United States Patent
Hossain et al.

(10) Patent No.: US 10,621,554 B2
(45) Date of Patent: Apr. 14, 2020

(54) IMAGE REPRESENTATION OF E-MAILS

(71) Applicant: International Business Machines Corporation, Armonk, NY (US)

(72) Inventors: Syed F. Hossain, Hopewell Junction, NY (US); Yunli Tang, Wappingers Falls, NY (US); Gregg M. Arquero, White Plains, NY (US); Joshua A. Schaeffer, White Plains, NY (US); Eli M. Dow, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 15/825,129

(22) Filed: Nov. 29, 2017

(65) Prior Publication Data

US 2019/0164131 A1    May 30, 2019

(51) Int. Cl.
*G06F 15/16* (2006.01)
*G06Q 10/10* (2012.01)
*H04L 12/58* (2006.01)

(52) U.S. Cl.
CPC ........... *G06Q 10/107* (2013.01); *H04L 51/22* (2013.01); *H04L 51/24* (2013.01)

(58) Field of Classification Search
CPC ........ G06Q 10/107; H04L 51/22; H04L 51/24
USPC ........................................................ 709/206
See application file for complete search history.

(56) References Cited

U.S. PATENT DOCUMENTS

| | | | |
|---|---|---|---|
| 6,721,734 B1 * | 4/2004 | Subasic | ................. G06F 16/338 |
| 7,437,005 B2 | 10/2008 | Drucker et al. | |
| 7,506,263 B1 | 3/2009 | Johnston et al. | |
| 8,180,837 B2 | 5/2012 | Lu et al. | |
| 8,503,717 B2 | 8/2013 | Sheinin et al. | |
| 9,043,413 B2 | 5/2015 | Kraft et al. | |
| 9,137,048 B2 | 9/2015 | Tokuda et al. | |
| 2007/0156732 A1 * | 7/2007 | Surendran | ............ G06Q 10/107 |
| 2009/0110275 A1 | 4/2009 | Ahmed | |
| 2009/0254498 A1 * | 10/2009 | Gupta | .................. G06Q 10/107 706/12 |
| 2012/0253916 A1 | 10/2012 | Ayloo | |
| 2014/0053081 A1 | 2/2014 | Struhl et al. | |
| 2015/0026104 A1 * | 1/2015 | Tambos | .................. G06F 16/24 706/12 |
| 2015/0215245 A1 | 7/2015 | Carlson et al. | |

(Continued)

FOREIGN PATENT DOCUMENTS

WO    2016040368 A1    3/2016

OTHER PUBLICATIONS

Byun et al.; "A Discriminative Classifier Learning Approach to Image Modeling and Spam Image Identification", CEAS 2007—Fourth Conference on Email and Anti-Spam, Aug. 2-3, 2007, Mountain View, California, 9 pages.

(Continued)

*Primary Examiner* — Atta Khan

(74) *Attorney, Agent, or Firm* — Edward J. Wixted, III; Brian M. Restauro

(57) ABSTRACT

An indication of receipt of a first e-mail is received. A determination is made whether the first e-mail matches, within a threshold, a group of e-mails. An image associated with the group of e-mails is retrieved. The retrieved image is assigned to the first e-mail and the retrieved image is displayed with the first e-mail in a list of e-mails.

14 Claims, 6 Drawing Sheets

(56) References Cited

U.S. PATENT DOCUMENTS

2016/0005054 A1* 1/2016 Koshak .............. G06Q 30/0201
                                                        705/7.29
2016/0070954 A1   3/2016 Barak et al.
2016/0283071 A1* 9/2016 Bai .......................... H04L 51/16
2016/0316097 A1  10/2016 Lineweber et al.

OTHER PUBLICATIONS

Koren et al.; "Automatically Tagging Email by Leveraging Other Users' Folder", KDD'11 ACM 17th SIGKDD International Conference on Knowledge Discovery and Data Mining, San Diego, California, Aug. 21-24, 2011, pp. 913-921.
Phadke, Swapna Gautam, "Email Classification Using a Self-Learning Technique Based on User Preferences", North Dakota State University, Master Thesis, Oct. 2015, 55 pages.

* cited by examiner

IMAGE REPRESENTATION OF E-MAILS

BACKGROUND

The present invention relates generally to the field of electronic mail (e-mail), and more particularly to representing an individual e-mail or a group of similar e-mails with an image.

The use of e-mail as a means of communication is widespread. An individual can have a personal e-mail account (or multiple personal accounts) as well as one or more accounts associated with an employer. Access to e-mails is convenient via personal computers, tablet computers, smartphones, phablets, and smartwatches. E-mails can come in many forms; some examples include family and friend communications, confirmation of an online order, update of a trip itinerary, communication from a health provider, phishing e-mail, spam, and the like.

SUMMARY OF THE INVENTION

Embodiments of the present invention include an approach for representing e-mail with an image. In one embodiment, an indication of receipt of a first e-mail is received. A determination is made whether the first e-mail matches, within a threshold, a group of e-mails. An image associated with the group of e-mails is retrieved. The retrieved image is assigned to the first e-mail and the retrieved image is displayed with the first e-mail in a list of e-mails.

DETAILED DESCRIPTION

Embodiments of the present invention provide for representing an electronic mail (i.e., an e-mail) or a group of e-mails with an image. Current e-mail programs display e-mails by a particular attribute of an e-mail such as the sender, the subject, or the date and time. A user receiving a large number of e-mails can require a lot of time to read all of the e-mails and determine which are important, which must be replied to, which can be deleted, which must be forwarded, etc. Looking at and reading each e-mail is an inefficient way to process a large number of e-mails.

Embodiments of the present invention recognize that there is an approach for representing an e-mail or a group of e-mails with an image. In an embodiment, the e-mail habits of a user can be learned resulting in the creation of a plurality of groups of e-mails. Each of the plurality of groups can be represented by a unique image so that a user can easily distinguish one group from another. New e-mails received by the user can be analyzed and assigned to the appropriate group saving the user time.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
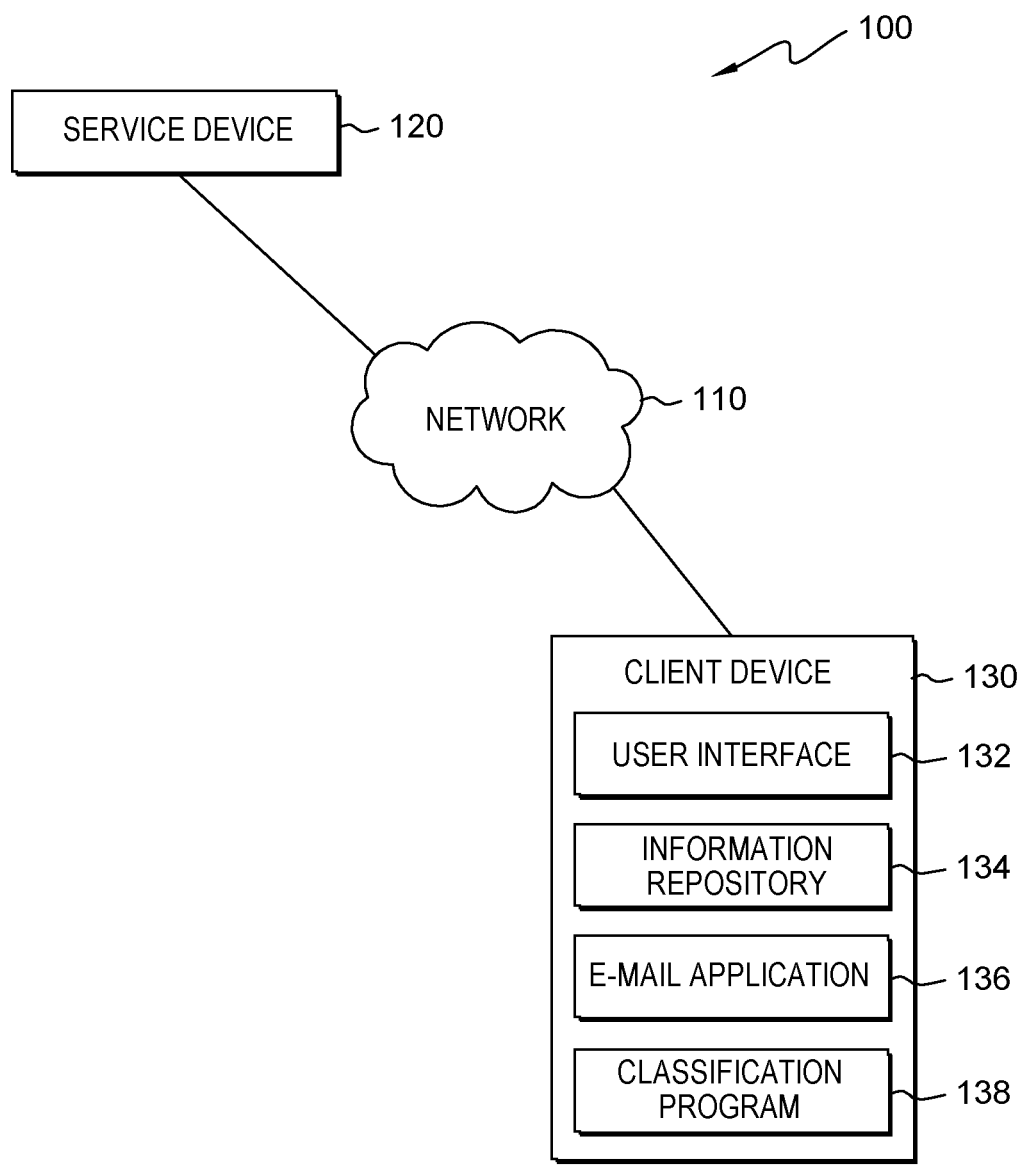
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120 and client device 130, interconnected via network 110. In example embodiments, computing environment 100 may include other computing devices (not shown in FIG. 1) such as smart watches, cell phones, smartphones, wearable technology, phablets, tablet computers, laptop computers, desktop computers, other computer servers or any other computer system known in the art, interconnected to server device 120 and client device 130, over network 110.

In an embodiment of the present invention, server device 120 and client device 130 connect to network 110, which enables server device 120 and client device 130 to access other computing devices and/or data not directly stored on server device 120 and client device 130. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between server device 120, client device 130, and any other computing devices connected to network 110, in accordance with embodiments of the present invention. In an embodiment, data received by another computing device (not shown in FIG. 1) in computing environment 100 may be communicated to server device 120 and client device 130 via network 110.

In an embodiment, server device 120 is a device that processes e-mails from one user to another user. According to an embodiment of the present invention, server device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. In an embodiment, computing environment 100 includes any number of server device 120. Server device 120 includes components as depicted and described in further detail with respect to FIG. 6, in accordance with embodiments of the present invention.

In an embodiment, client device 130 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, client device 130 represents a computer system utilizing clustered computers and components (e.g., database server computers, application server computers, etc.) that act as a single pool of seamless resources when accessed by elements of computing environment 100. In general, client device 130 is representative of any electronic device or combination of electronic devices capable of executing computer readable program instructions. In an embodiment, computing environment 100 includes any number of client device 130. Client device 130 includes components as depicted and described in further detail with respect to FIG. 6 and client device 130 is substantially similar to server device 120, in accordance with embodiments of the present invention.

According to an embodiment of the present invention, client device 130 includes user interface 132, information repository 134, e-mail application 136, and classification program 138. In an embodiment, user interface 132 provides an interface between a user of client device 130, network 110 and any other devices connected to network 110. User interface 132 allows a user of client device 130 to interact with the Internet and also enables the user to receive an indicator of one or more previous viewing locations and a summary of viewing history on the Internet. In general, a user interface is the space where interactions between humans and machines occur. User interface 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 132 may also be mobile application software that provides an interface between a user of client device 130 and network 110. Mobile application software, or an "app," is a computer program designed to run on smartphones, phablets, tablet computers and other mobile devices.

In an embodiment, information repository 134 may be storage that may be written to and/or read by classification program 138. In one embodiment, information repository 134 resides on client device 130. In another embodiment, information repository 134 may reside on server device 120 or any other device (not shown in FIG. 1) in computing environment 100, in cloud storage or on another computing device accessible via network 110. In yet another embodiment, information repository 134 may represent multiple storage devices within client device 130. Examples of data stored to information repository 134 include common action groups for use by e-mail application 136, keywords, lookup tables for the keywords and e-mail attributes, and sentiment scores for e-mails.

In an embodiment, information repository 134 may be implemented using any volatile or non-volatile storage media for storing information, as known in the art. For example, information repository 134 may be implemented with a tape library, optical library, one or more independent hard disk drives, multiple hard disk drives in a redundant array of independent disks (RAID), solid-state drives (SSD), or random-access memory (RAM). Similarly, information repository 134 may be implemented with any suitable storage architecture known in the art, such as a relational database, an object-oriented database, or one or more tables. In an embodiment of the present invention, classification program 138 and any other programs and applications (not shown in FIG. 1) operating on client device 130 may store, read, modify, or write data to information repository 134.

According to an embodiment of the present invention, e-mail application 136 is an application for managing the e-mail of a user. In an embodiment, functions performed by e-mail application 136 include composing an e-mail, spell-checking the e-mail, sending the e-mail to one or more other users, filing the sent e-mail, receiving an e-mail from another user, replying to the received e-mail, forwarding the received e-mail, filing the received e-mail, deleting both sent and received e-mails, and other similar functions. In an embodiment, e-mail application 136 may be part of an operating system on client device 130 (not shown in FIG. 1). In another embodiment, e-mail application 136 may be a stand-alone application.

According to embodiments of the present invention, classification program 138 is a program, a subprogram of a larger program, an application, a plurality of applications, or mobile application software, which functions to represent an e-mail or a group of e-mails with an image. A program is a sequence of instructions written by a programmer to perform a specific task. In an embodiment, classification program 138 analyzes the behaviors of a user as the user processes a number of e-mails. In the embodiment, classification program 138 uses the analysis to create one or more groups for the assignment of the number of e-mails. Further in the embodiment, classification program 138 uses sentiment analysis, keyword extraction, and e-mail attributes to match a new e-mail to at least one of the created groups of e-mails for assignment. Classification program 138 may run by itself but may be dependent on system software (not shown in FIG. 1) to execute. In one embodiment, classification program 138 functions as a stand-alone program residing on client device 130. In another embodiment, classification program 138 may work in conjunction with other programs, applications, etc., found on client device 130 or on any other device in computing environment 100. In yet another embodiment, classification program 138 may be found on server device 120 or on other computing devices (not shown in FIG. 1) in computing environment 100, which are interconnected to client device 130 via network 110.

Figure 2:
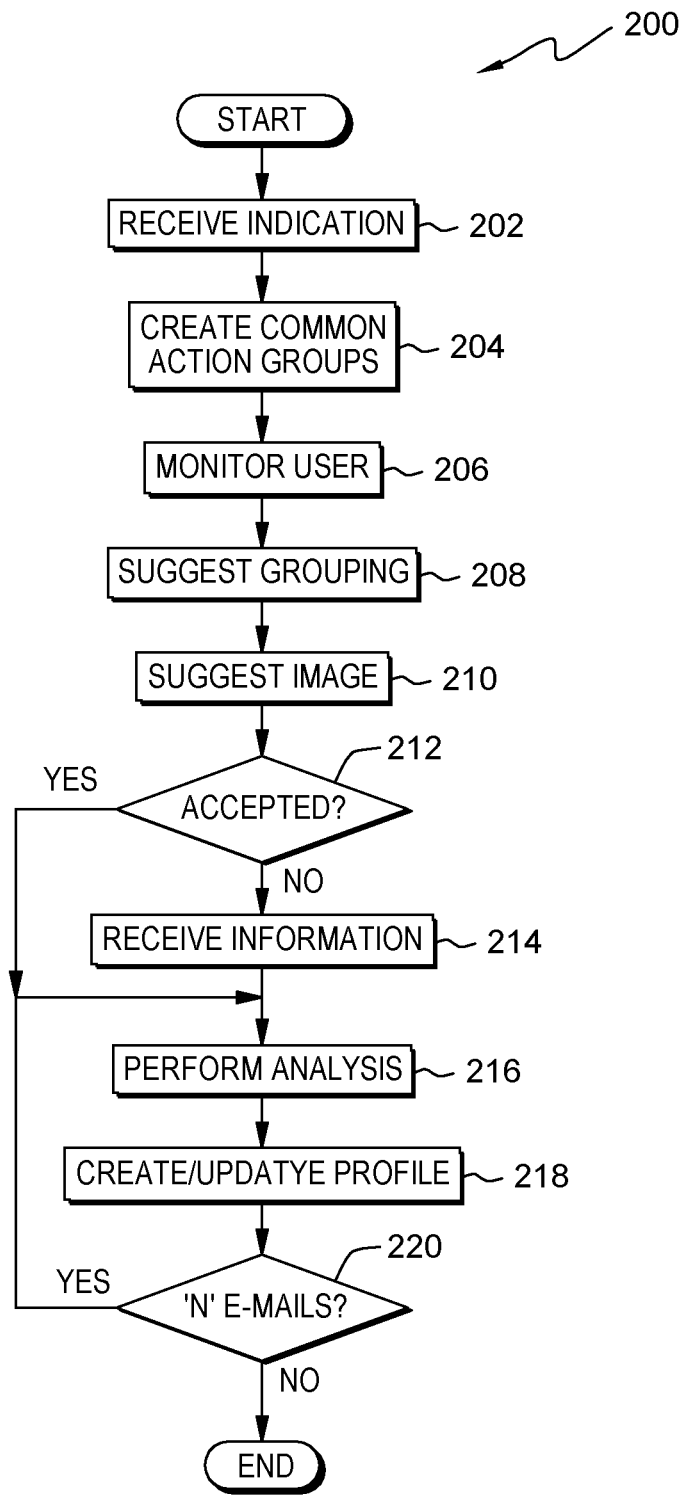
FIG. 2 depicts a flowchart of a program for setting up a computing device to represent e-mails with an image, in accordance with an embodiment of the present invention.

FIG. 2 is a flowchart of workflow 200 depicting an approach for setting up a computing device to represent a plurality of e-mails with an image. In one embodiment, the method of workflow 200 is performed by classification program 138. In an alternative embodiment, the method of workflow 200 may be performed by any other program working with classification program 138. In an embodiment, a user may invoke workflow 200 upon powering on client device 130. In an alternative embodiment, a user may invoke workflow 200 upon accessing classification program 138.

In an embodiment, classification program 138 receives an indication (step 202). In other words, classification program 138 receives an indication of a user opening an e-mail on a computing device. In an embodiment, classification program 138 receives an indication of a user opening an e-mail within e-mail application 136, using user interface 132, on client device 130. For example, "Joe" opens an e-mail in the e-mail app on the laptop owned by "Joe".

In an embodiment, classification program 138 creates common action groups (step 204). In other words, responsive to receiving the indication of a user opening an e-mail, classification program 138 creates four-common action/e-mail groups to which the user can assign an e-mail. In an embodiment, the four-common action/e-mail groups include REPLY, FORWARD, URGENT, and DELETE. In another embodiment, the user can modify the four-common action/e-mail groups by changing a name (e.g., changing URGENT to IMPORTANT). In yet another embodiment, the user can create a custom group (e.g., FLAG) that will supplement the four-common action/e-mail groups. In an embodiment, classification program 138 creates the four-common action/e-mail groups REPLY, FORWARD, URGENT, and DELETE for e-mail application 136 on client device 130. For example, the four-common action/e-mail groups REPLY, FORWARD, URGENT, and DELETE are created for the e-mail app on the laptop owned by "Joe".

In an embodiment, classification program 138 monitors a user (decision step 206). In other words, classification program 138 monitors a user as the user processes a plurality of e-mails received by the e-mail application of the user. In an embodiment, classification program 138 monitors how the user processes each e-mail in the plurality of e-mails to learn the behaviors of the user while looking for repetitive patterns (e.g., an e-mail from a particular sender is always deleted and e-mails from a particular company are always assigned to a shopping group). According to an embodiment of the present invention, classification program 138 uses machine learning to monitor the user. Machine learning is a field of computer science that gives computers the ability to learn without being explicitly programmed. In an embodiment, the learned behaviors are saved to a memory by classification program 138. In an embodiment, classification program 138 monitors the user of client device 130 as the user processes a plurality of e-mails included in e-mail application 136 and classification program 138 stores learned behaviors of the user to information repository 134. For example, "Joe" processes a number of e-mails using the e-mail app on the laptop owned by "Joe".

In an embodiment, classification program 138 suggests a grouping (step 208). In other words, based on the learned behaviors of the user and similarities between e-mails, classification program 138 suggests one or more e-mail groupings that the user can assign specific e-mails to. In an embodiment, the one or more e-mail groupings are the four-common action/e-mail groups. In another embodiment, the one or more e-mail groupings include one or more custom groups suggested by classification program 138. In yet another embodiment, the one or more e-mail groupings include one or more custom groups created by the user. According to an embodiment of the present invention, classification program 138 suggests the four-common action/e-mail groups and one custom e-mail group "FLAG" to the user of client device 130 for processing e-mails in e-mail application 136. For example, the e-mail app on the laptop owned by "Joe" is setup with the four-common action/e-mail groups and two custom groups, "FAMILY" and "FOOTBALL".

In an embodiment, classification program 138 suggests an image (step 210). In other words, classification program 138 suggests an image to represent each of the e-mail groups (i) suggested by classification program 138 or (ii) created by the user. In an embodiment, the suggested images are default images included in classification program 138. In another embodiment, the suggested images are images stored to a memory by the user. In yet another embodiment, the suggested images are any public image found on the Internet. According to an embodiment of the present invention, classification program 138 suggests an image that has been stored to information repository 134 by the user of client device 130 for each of the e-mail groups. For example, "Joe" receives a suggested image for each common action/e-mail group: a backward arrow for REPLY, a forward arrow for FORWARD, an exclamation point for URGENT, and a trash can for DELETE. "Joe" also receives a suggested image for each of the two created e-mail groups as follows: an image of a family of four for "FAMILY" and an image of a football for "FOOTBALL".

In an embodiment, classification program 138 determines whether an image was accepted (decision step 212). In other words, classification program 138 determines whether the image(s) suggested for each e-mail group by classification program 138 were accepted by the user. In an embodiment (decision step 212, NO branch), classification program 138 determines that a suggested image was not accepted; therefore, classification program 138 proceeds to step 214 to receive information. In the embodiment (decision step 212, YES branch), classification program 138 determines that the suggested images were accepted; therefore, classification program 138 proceeds to step 216 to perform an analysis.

In an embodiment, classification program 138 receives information (step 214). In other words, responsive to determining that a suggested image was not accepted by the user, classification program 138 receives information from a user. In an embodiment, the information is an image to be used for a particular e-mail group. In another embodiment, the information is a request to search for alternative image options to use for one or more particular e-mail groups. In yet another embodiment, the information is a request to offer another suggested image for consideration. In yet another embodiment, the information is a request to use a name for the e-mail group rather than an image. According to an embodiment of the present invention, classification program 138 receives information from a user of client device 130 to use an image provided by the user for a particular e-mail group. For example, "Joe" uploads an image of "Grampa" to use for the "FAMILY" e-mail group in place of the suggested image of a family of four.

In an embodiment, classification program 138 performs an analysis (step 216). In other words, classification program 138 analyzes each e-mail group to map the behaviors of the user to each group and to create a profile for each group. In an embodiment, classification program 138 uses sentiment analysis, natural language processing (NLP), keyword extraction, and a determination of e-mail attributes (i.e., a number of recipients, a number of attachments, a type of attachment, etc.) to analyze the e-mails in an e-mail group.

In an embodiment, sentiment analysis (also known as opinion mining) refers to the use of NLP, text analysis and computational linguistics to identify and extract subjective information in source materials such as e-mails. Sentiment analysis is widely applied to reviews and social media for a variety of applications, ranging from marketing to customer service. Sentiment analysis aims to determine the attitude of an author with respect to some topic or the overall contextual polarity of a document. The attitude may be a judgment or evaluation, an affective state (i.e., the emotional state of the author when writing), or the intended emotional communication (i.e., the emotional effect the author wishes to have on the reader).

In an embodiment, NLP is a field of computer science, artificial intelligence and computational linguistics concerned with the interactions between computers and human (i.e., natural) languages. NLP techniques known in the art include dictionary-based and topic-modeling approaches.

In an embodiment, keyword extraction is the automatic identification of terms that best describe the subject of a document such as an e-mail. "Key phrases", "key terms", "key segments", or just "keywords" are the terminology which is used for defining the terms that represent the most relevant information contained in the document. Although the terminology is different between "key phrases", "key terms", "key segments", and "keywords", the function is the same: characterization of the topic discussed in a document. The task of keyword extraction is an important tool in text mining, information retrieval, and NLP.

In an embodiment, e-mail attributes are also analyzed. According to an embodiment of the present invention, e-mail attributes include the number of recipients, the number of attachments to the e-mail, and the type of attachments (i.e., text document, spreadsheet, presentation file, portable document format (PDF) file, photograph, music file, podcast, and the like).

In an embodiment, classification program 138 performs an analysis of each e-mail group associated with e-mail application 136 on client device 130 using sentiment analysis, NLP, keyword extraction, and attribute determination. For example, the e-mails in the four-common action/e-mail groups (i.e., REPLY, FORWARD, URGENT, and DELETE) and the two custom groups (i.e., "FAMILY" and "FOOTBALL") in the e-mail app on the laptop owned by "Joe" are analyzed.

In an embodiment, classification program 138 creates or updates a profile (step 218). In other words, classification program 138 creates a new profile or updates an existing profile for each e-mail group based on the analysis of that e-mail group. In an embodiment, classification program 138 creates a profile for an e-mail group after an analysis of the plurality of e-mails in the e-mail group. In another embodiment, classification program 138 updates an existing profile after 'N' new e-mails have been assigned to the e-mail group. According to an embodiment of the present invention, the profile for each e-mail group includes a spider graph based on the sentiment analysis of the group and a lookup table based on the NLP analysis, keyword extraction, and attribute determination of the e-mail group. In an embodiment, the spider graph is a graphical method of displaying multivariate data in the form of a two-dimensional chart of three or more quantitative variables represented on axes starting from the same point. The relative position and angle of the axes is uninformative. In an embodiment, the lookup table provides a means of comparison between an e-mail group and a new e-mail by comparing common words and attributes between the e-mail group and the new e-mail. In an embodiment, classification program 138 creates a new profile for a plurality of e-mails received by e-mail application 136 on client device 130 based on the sentiment analysis of the plurality of e-mails and a lookup table of common words and attributes of the plurality of e-mails. For example, a profile is created for the "FAMILY" group of e-mails received by the e-mail app on the laptop owned by "Joe".

In an embodiment, classification program 138 determines whether 'N' e-mails have been received (decision step 220). In other words, classification program 138 determines whether 'N' e-mails have been received by an e-mail application. In an embodiment, when 'N' e-mails have been received for a particular e-mail group, the profile of the e-mail group is updated based on a new sentiment analysis of the plurality of e-mails in the e-mail group and the creation of a lookup table based on common words and attributes of the plurality of e-mails in the e-mail group. In an embodiment, 'N' is determined by classification program 138. In another embodiment, 'N' is predefined by a user. In yet another embodiment, a user may use a user defined or classification program 138 suggested timeframe (e.g., three months, one year, etc.) in place of 'N'. In an embodiment (decision step 220, YES branch), classification program 138 determines that 'N' e-mails have been received; therefore, classification program 138 proceeds to step 216 to perform an analysis. In the embodiment (decision step 220, NO branch), classification program 138 determines that 'N' e-mails have not been received; therefore, classification program 138 ends.

Figure 3:
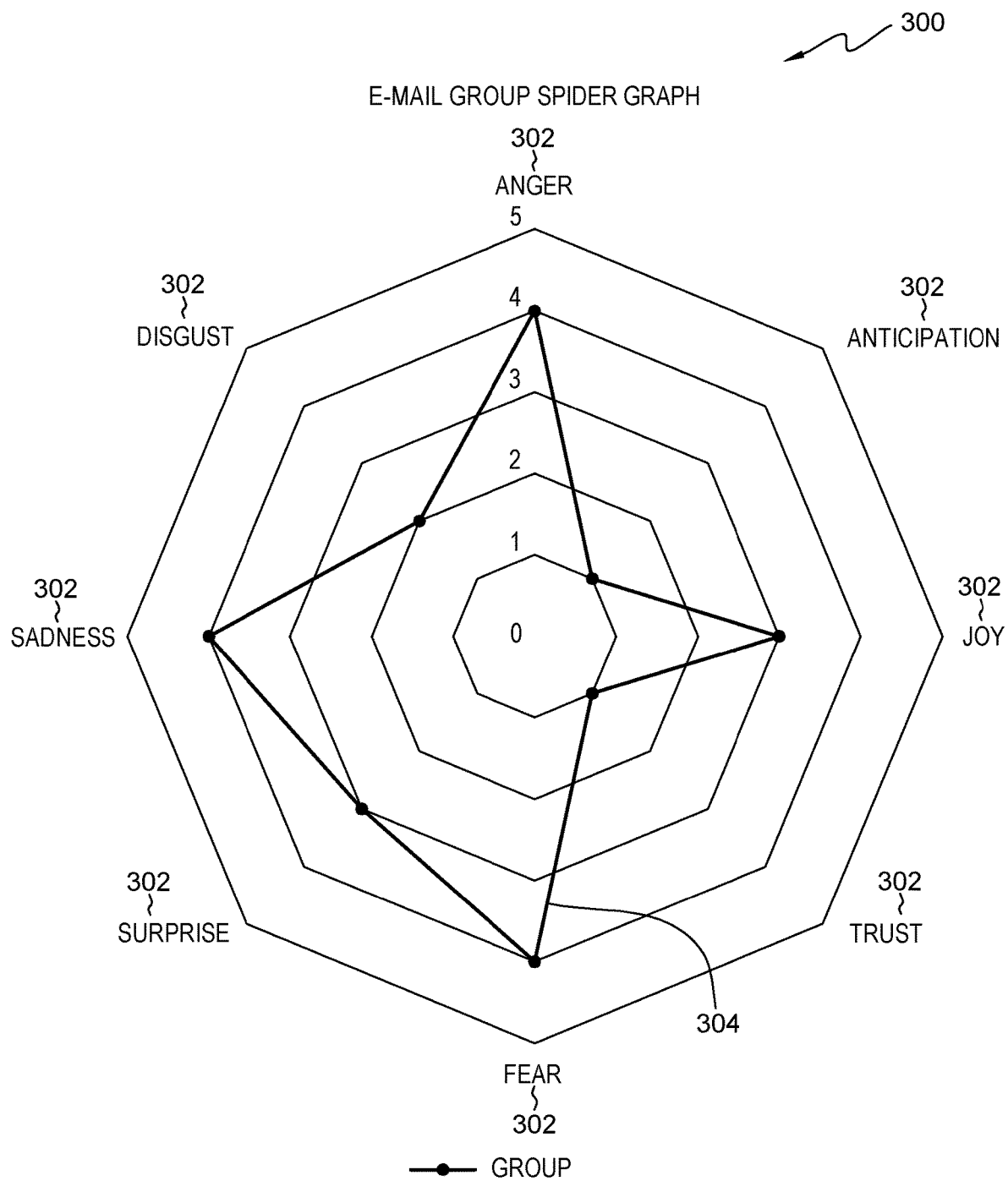
FIG. 3 depicts an example of a spider graph based on sentiment analysis of a plurality of e-mails, according to an embodiment of the present invention.

FIG. 3 is a diagram of spider graph 300 that is based on sentiment analysis of a plurality of e-mails. In an embodiment, spider graph 300 includes eight sentiment 302: anger, anticipation, joy, trust, fear, surprise, sadness, and disgust. According to an embodiment of the present invention, sentiment analysis of the plurality of e-mails results in a score for each sentiment 302 and the score for each sentiment 302 is plotted in spider graph 300 to form group profile 304. In an embodiment, group profile 304 represents the overall sentiment of the plurality of e-mails. For example, the scores for each sentiment which creates the "FAMILY" e-mail group profile in the e-mail app on the laptop owned by "Joe" are as follows: anger is four, anticipation is one, joy is three, trust is one, fear is four, surprise is three, sadness is four, and disgust is two.

Figure 4:
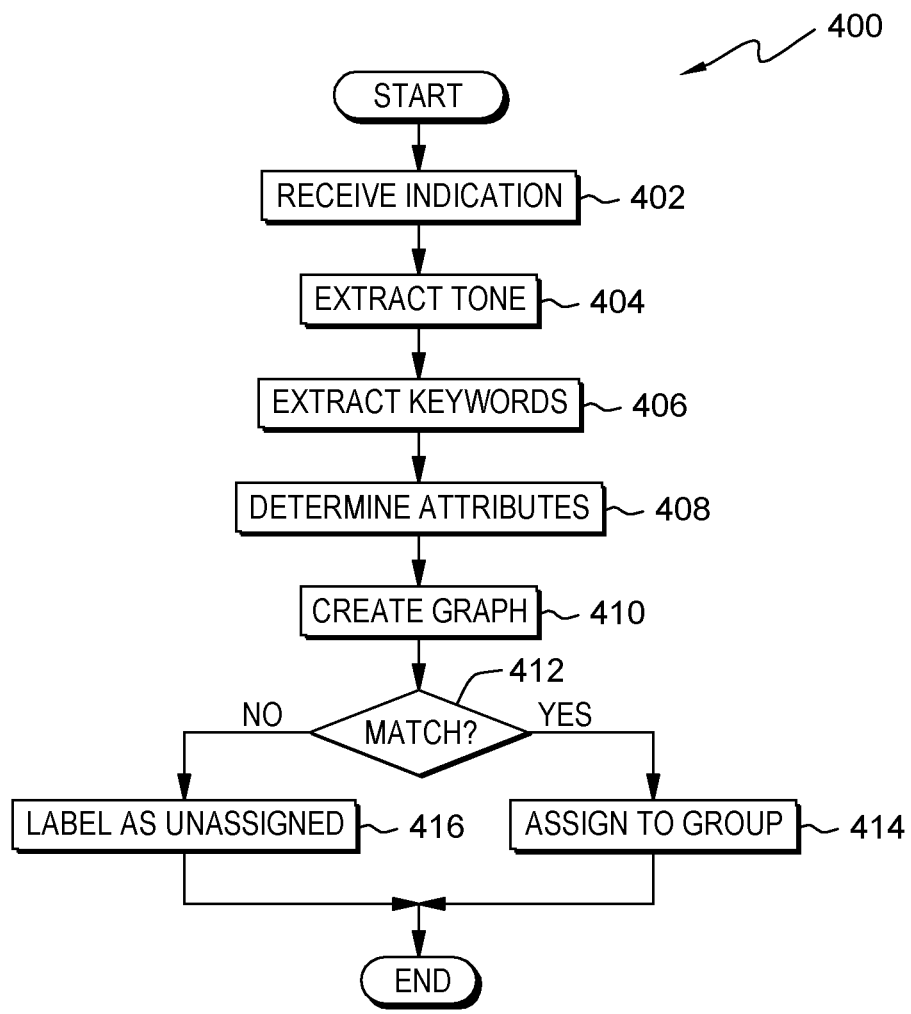
FIG. 4 depicts a flowchart of a program for representing an e-mail with an image, in accordance with an embodiment of the present invention.

FIG. 4 is a flowchart of workflow 400 depicting an approach for representing an e-mail with an image. In one embodiment, the method of workflow 400 is performed by classification program 138. In an alternative embodiment, the method of workflow 400 may be performed by any other program working with classification program 138. In an embodiment, a user may invoke workflow 400 upon powering on client device 130. In an alternative embodiment, a user may invoke workflow 400 upon accessing classification program 138.

In an embodiment, classification program 138 receives an indication (step 402). In other words, classification program 138 receives an indication of a new e-mail received by an e-mail application that has a plurality of e-mail group profiles. In an embodiment, the e-mail application may be open and active. In another embodiment, the e-mail application may be sleeping (i.e., open, but not active). In yet another embodiment, the e-mail application may be running in the background. According to an embodiment of the present invention, classification program 138 receives an indication that a new e-mail has been received by e-mail application 136 on client device 130. For example, the e-mail app on the laptop owned by "Joe" receives an e-mail sent by "Bill, the brother of "Joe".

In an embodiment, classification program 138 extracts a tone (step 404). In other words, classification program 138 uses sentiment analysis, similarly to as described in step 216, to extract a tone for the received e-mail. In an embodiment, the tone may be a single emotion. In another embodiment, the tone may be any number of emotions up to eight. In an embodiment, classification program 138 extracts the overall tone from the e-mail received by e-mail application 136 on client device 130. For example, the following emotions are extracted and given a score, which creates an overall tone, from the e-mail received by the e-mail app on the laptop owned by "Joe": anger with a score of five, anticipation with a score of two, joy with a score of three, trust with a score of one, fear with a score of three, surprise with a score of four, sadness with a score of five, and disgust with a score of zero.

In an embodiment, classification program 138 extracts keywords (step 406). In other words, classification program 138 extracts keywords, similarly to as described in step 216, from the newly received e-mail. In an embodiment, the keywords are stored to a lookup table so that the stored lookup table can be compared to a stored lookup table for the group e-mail. In an embodiment, classification program 138 extracts keywords from the e-mail received by e-mail application 136 and stores the extracted keywords to a lookup table stored to information repository 134 on client device 130. For example, three keywords—'reunion', 'family', and 'October'—are extracted from the new e-mail received by the e-mail app on the laptop owned by "Joe" and the three keywords are stored to a lookup table in a memory on the laptop owned by "Joe".

In an embodiment, classification program 138 determines attributes (step 408). In other words, classification program 138 determines attributes, similarly to as described in step 216, from the newly received e-mail. In an embodiment, determined attributes include the number of recipients, the number of attachments, the type of attachments, and the like. According to an embodiment of the present invention, classification program 138 stores the determined attributes to a lookup table so that the stored lookup table can be compared to a stored lookup table for the group e-mail. In an embodiment, classification program 138 determines the attributes of the e-mail received by e-mail application 136 on client device 130 and stores the determined attributes to a lookup table. For example, the e-mail received by the e-mail app on the laptop owned by "Joe" includes the following attributes: twenty-three recipients and one PDF attachment.

In an embodiment, classification program 138 creates a graph (step 410). In other words, classification program 138 uses the extracted tone to create a spider graph for the received e-mail. In an embodiment, classification program 138 compares the created spider graph to the stored spider graph for the four-common action groups and the user created e-mail groups to determine if the created spider graph matches the spider graph for the four-common action groups or the user created e-mail groups. According to an embodiment of the present invention, classification program 138 creates a spider graph based on the sentiment analysis of the e-mail received by e-mail application 136 on client device 130. For example, a spider graph is created for the e-mail received by the e-mail app on the laptop owned by "Joe" using the following extracted tone information: anger of five, anticipation of two, joy of three, trust of one, fear of three, surprise of four, sadness of five, and disgust of zero.

In an embodiment, classification program 138 determines whether a match is found (decision step 412). In other words, classification program 138 determines whether a spider graph for the new e-mail matches a spider graph in a profile of an e-mail group. In an embodiment, the match of spider graphs is an exact match. In another embodiment, the match of spider graphs is within a threshold, the threshold is defined by either a user or classification program 138, and the user or classification program 138 also defines how many attributes must meet the threshold criteria. For example, a spider graph with a scale of "1" to "5" with a twenty percent threshold indicates that an attribute with a score of one would match the same attribute with a score of two. For another example, a spider graph with a scale of "0" to "8" with a user defined threshold of "1" unit indicates that an attribute with a score of six would match the same attribute with a score of either five or seven. In either example, the user may define that four of the eight attributes must meet the threshold for the e-mail to be considered a match.

In an embodiment, classification program 138 can also determine a match based on a lookup table match between that of the received e-mail and a stored lookup table of one of the e-mail groups. According to an embodiment of the present invention, the match can be based on a number of matched keywords, a number of matched e-mail attributes, or a combination of matched keywords and matched e-mail attributes. In an embodiment, the match can be an exact match. In another embodiment, the match can be a partial match. In an embodiment, the number of matches is determined by classification program 138. In another embodiment, the number of matches is determined by a user.

In an embodiment (decision step 412, YES branch), classification program 138 determines that there is a match; therefore, classification program 138 proceeds to step 314 to assign the e-mail to the matched group. In the embodiment (decision step 412, NO branch), classification program 138 determines that there is not a match; therefore, classification program 138 proceeds to step 316 to label the e-mail as unassigned.

In an embodiment, classification program 138 assigns to a group (step 414). In other words, responsive to determining that a spider graph for the new e-mail matches a spider graph of a profile for an existing e-mail group, classification program 138 assigns the new e-mail to the matched e-mail group. In an embodiment, classification program 138 also assigns the associated image from the matched e-mail group to the new e-mail. According to an embodiment of the present invention, classification program 138 assigns the e-mail received by e-mail application 136 on client device 130 to a matched e-mail group and assigns the image associated with the matched e-mail group to the new image. For example, the e-mail from "Bill" is assigned to the "FAMILY" group in the e-mail app on the laptop owned by "Joe" and the e-mail from "Bill" is assigned the image of "Grampa".

In an embodiment, classification program 138 labels as unassigned (step 416). In other words, responsive to determining that there is not a match, classification program 138 labels the new e-mail as unassigned. In an embodiment, the unassigned e-mail group does not have an associated image. In another embodiment, the unassigned e-mail group has a question mark associated image. In yet another embodiment, the unassigned e-mail group has an associated image assigned by classification program 138. In yet another embodiment, the unassigned e-mail group has an associated image assigned by a user. In an embodiment, classification program 138 labels the unmatched e-mail as unassigned in e-mail application 136 on client device 130 and assigns the image of a question mark to the unmatched e-mail.

According to an embodiment of the present invention, classification program 138 performs a periodic analysis of the e-mails labeled as unassigned. In the embodiment, if a number of e-mails in the unassigned group match, based on spider graphs or lookup tables meeting a threshold, classification program 138 may suggest a new e-mail group and image to the user. Further in the embodiment, the user can accept the suggestion, reject the suggestion, request a new e-mail group and/or image for the suggested group, or provide a new e-mail group and/or name for the suggested group.

Figure 5:
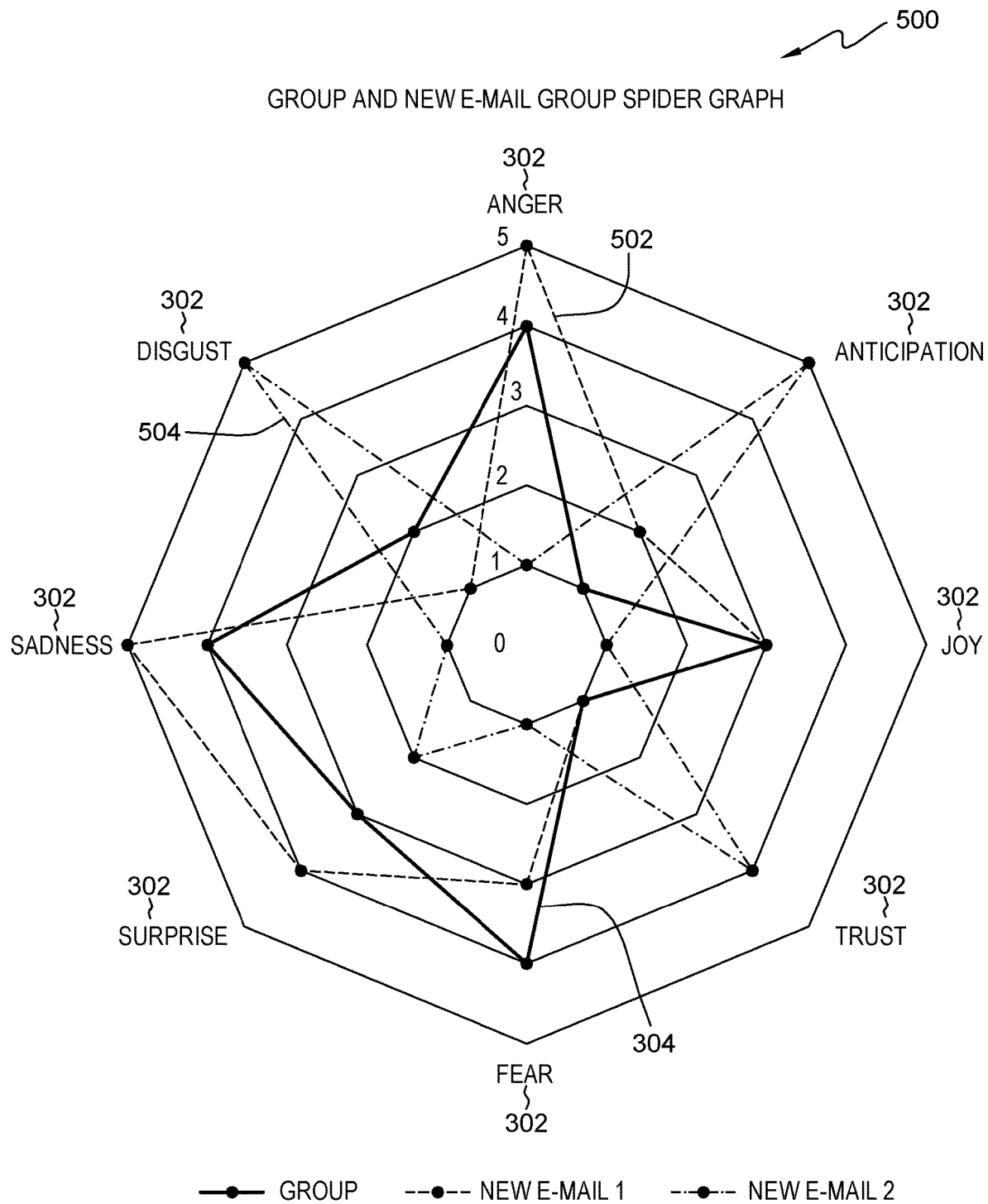
FIG. 5 depicts an example of multiple spider graphs based on sentiment analysis of a plurality of e-mails and two individual e-mails, in accordance with an embodiment of the present invention.

FIG. 5 is a diagram of spider graph 500 that overlays spider graph 300 with the spider graphs of two new received e-mails in order to determine a match. In an embodiment, new e-mail number one is represented by profile 502 and has the following sentiment 302 values: anger of five, anticipation of two, joy of three, trust of one, fear of three, surprise of four, sadness of five, and disgust of one. In the embodiment, new e-mail number two is represented by profile 504 and has the following sentiment 302 values: anger of one, anticipation of five, joy of one, trust of four, fear of one, surprise of two, sadness of one, and disgust of five. According to an embodiment of the present invention, new e-mail number one (i.e., profile 502) is within a twenty percent threshold of group profile 304 based on the eight sentiment 302 values; therefore, profile 502 is considered a match for group profile 304. The match is represented visually by the substantially similar shapes of group profile 304 and profile 502. Profile 504 is not a match as the shape of profile 504 is not similar to group profile 304.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Having described embodiments of an approach for representing an e-mail with an image, it is noted that modifications and variations may be made by persons skilled in the art in light of the above teachings. It is therefore to be understood that changes may be made in the particular embodiments disclosed which are within the scope of the invention as outlined by the appended claims.

Figure 6:
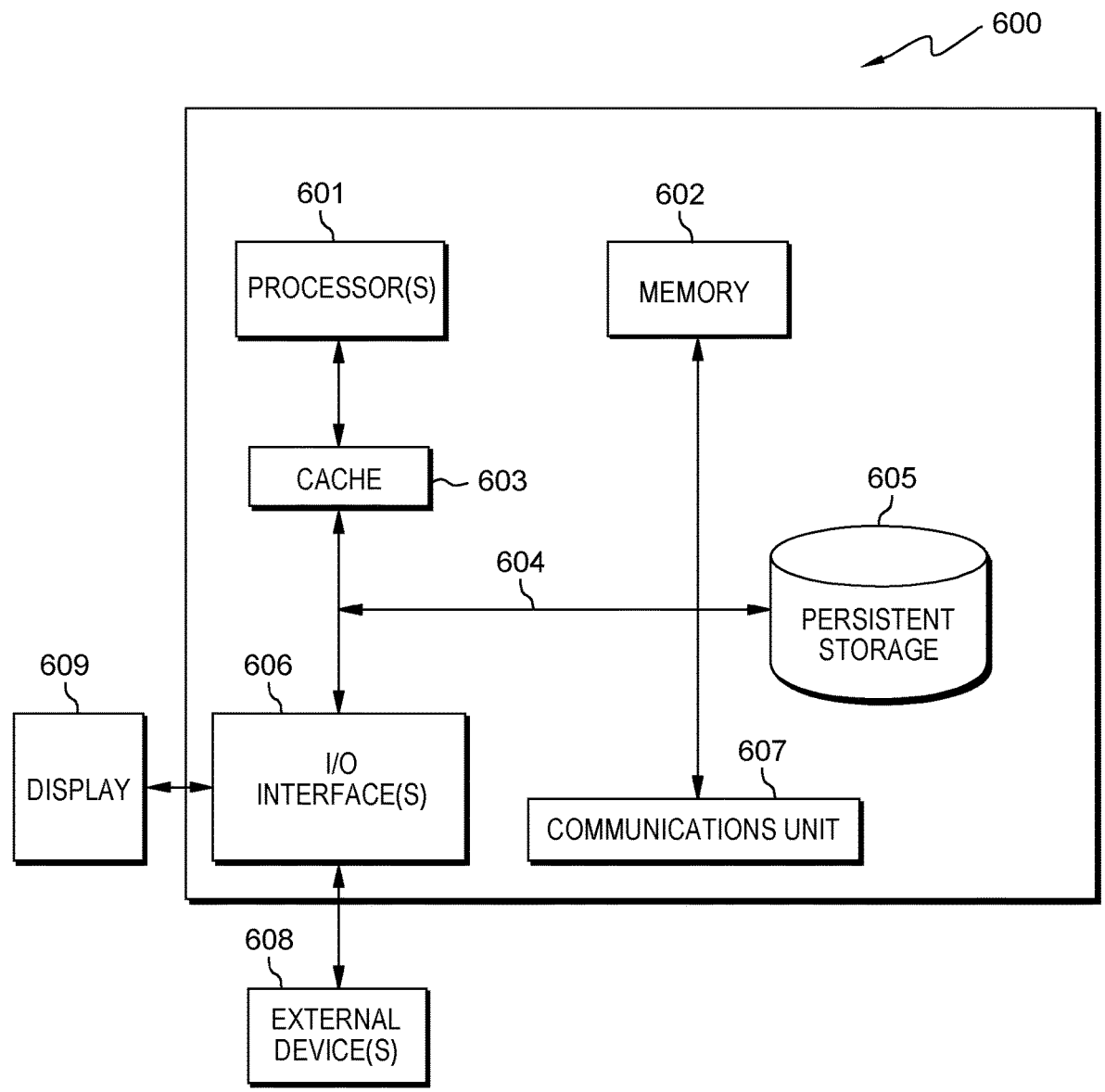
FIG. 6 depicts a block diagram of components of the computing environment of FIG. 1, in accordance with an embodiment of the present invention.

FIG. 6 depicts computer system 600, which is an example of a system that includes classification program 138. Computer system 600 includes processor(s) 601, cache 603, memory 602, persistent storage 605, communications unit 607, input/output (I/O) interface(s) 606 and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processors 601 by holding recently accessed data, and data near recently accessed data, from memory 602.

Program instructions and data used to practice embodiments of the present invention may be stored in persistent storage 605 and in memory 602 for execution by one or more of the respective processors 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data used to practice embodiments of the present invention may be downloaded to persistent storage 605 through communications unit 607.

I/O interface(s) 606 allows for input and output of data with other devices that may be connected to each computer system. For example, I/O interface 606 may provide a connection to external devices 608 such as a keyboard, keypad, a touchscreen, and/or some other suitable input device. External devices 608 can also include portable computer readable storage media such as, for example, thumb drives, portable optical or magnetic disks, and memory cards. Software and data used to practice embodiments of the present invention can be stored on such portable computer readable storage media and can be loaded onto persistent storage 605 via I/O interface(s) 606. I/O interface(s) 606 also connect to display 609.

Display 609 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    receiving, by one or more computer processors, an indication of receipt of a first e-mail;
    determining, by one or more computer processors, that the first e-mail matches, within a threshold, a group of e-mails;
    updating, by one or more computer processors, the group of e-mails by adding the first e-mail to the group of e-mails;
    creating, by one or more computer processors, a first spider graph for the updated group of e-mails based on one or more extracted tones for each e-mail of the group of e-mails, wherein:

the one or more extracted tones are comprised of between one and eight emotions including anger, anticipation, joy, trust, fear, surprise, sadness, and disgust; and the first spider graph includes one or more quantitative variables represented on axes starting from the same point;

retrieving, by one or more computer processors, an image associated with the updated group of e-mails;

assigning, by one or more computer processors, the retrieved image to the updated group of e-mails;

creating, by one or more computer processors, a visual association between the assigned image and each e-mail in the updated group of e-mails such that when selected, each e-mail in the updated group of e-mails displays the assigned image;

monitoring, by one or more computer processors, a processing of a plurality of e-mails by a user of a computing device, utilizing machine learning, wherein monitoring the processing of the plurality of e-mails by the user of the computing device comprises:

extracting, by one or more computer processors, an overall tone from each e-mail, wherein:

sentiment analysis, comprised of natural language processing, text analysis, and computational linguistics, is utilized to extract the overall tone from each e-mail;

the overall tone includes a plurality of emotions; and each emotion of the plurality of emotions is given a score;

extracting, by one or more computer processors, a keyword from each e-mail using keyword extraction for use in a lookup table; and extracting, by one or more computer processors, an attribute of each e-mail for use in the lookup table; and creating, by one or more computer processors, the group of e-mails based on monitored similarities between each e-mail of the group of e-mails.

2. The method of claim 1, wherein the extracted attribute is a number of recipients.

3. The method of claim 1, wherein determining that the first e-mail matches, within the threshold, the group of e-mails comprises:

creating, by one or more computer processors, a second spider graph for the first e-mail; and comparing, by one or more computer processors, the first spider graph to the second spider graph.

4. The method of claim 1, further comprising:

creating, by one or more computer processors, a profile for the group of e-mails based on the monitored processing of each respective e-mail of the group of e-mails, wherein the profile includes a spider graph and a lookup table;

determining, by one or more computer processors, that a predefined number of e-mails match, within the threshold, the group of e-mails; and subsequent to determining that the predefined number of e-mails match, within the threshold, the group of e-mails, updating, by one or more computer processors, the profile for the group of e-mails based on the e-mails comprising the predefined number of e-mails determined to match.

5. The method of claim 1, further comprising:

storing, by one or more computer processors, the keyword from each e-mail of the group of e-mails and the attribute from each e-mail of the group of e-mails to a first lookup table;

identifying, by one or more computer processors, a first keyword from the first e-mail and a first attribute from the first e-mail;

storing, by one or more computer processors, the first keyword and the first attribute to a second lookup table; and wherein determining that the first e-mail matches, within the threshold, the group of e-mails comprises: determining, by one or more computer processors, that the second lookup table for the first e-mail at least partially matches the first lookup table for the group of e-mails via a comparison of the second lookup table to the first lookup table.

6. A computer program product comprising:

one or more computer readable storage media; and program instructions stored on the one or more computer readable storage media, the program instructions comprising:

program instructions to receive an indication of receipt of a first e-mail;

program instructions to determine that the first e-mail matches, within a threshold, a group of e-mails;

program instructions to update the group of e-mails by adding the first e-mail to the group of e-mails;

program instructions to create a first spider graph for the updated group of e-mails based on one or more extracted tones for each e-mail of the group of e-mails, wherein:

the one or more extracted tones are comprised of between one and eight emotions including anger, anticipation, joy, trust, fear, surprise, sadness, and disgust; and the first spider graph includes one or more quantitative variables represented on axes starting from the same point;

program instructions to retrieve an image associated with the updated group of e-mails;

program instructions to assign the retrieved image to the updated group of e-mails;

program instructions to create a visual association between the assigned image and each e-mail in the updated group of e-mails such that when selected, each e-mail in the updated group of e-mails displays the assigned image;

program instructions to monitor a processing of a plurality of e-mails by a user of a computing device, utilizing machine learning, wherein the program instructions to monitor the processing of the plurality of e-mails by the user of the computing device comprises:

program instructions to extract an overall tone from each e-mail, wherein:

sentiment analysis, comprised of natural language processing, text analysis, and computational linguistics, is utilized to extract the overall tone from each e-mail;

the overall tone includes a plurality of emotions; and each emotion of the plurality of emotions is given a score;

program instructions to extract a keyword from each e-mail using keyword extraction for use in a lookup table; and program instructions to extract an attribute of each e-mail for use in the lookup table; and program instructions to create the group of e-mails based on monitored similarities between each e-mail of the group of e-mails.

7. The computer program product of claim 6, wherein the extracted attribute is a number of recipients.

8. The computer program product of claim 6, wherein program instructions to determine that the first e-mail matches, within the threshold, the group of e-mails comprises program instructions to:

create a second spider graph for the first e-mail; and
compare the first spider graph to the second spider graph.

9. The computer program product of claim 6, further comprising program instructions stored on the one or more computer readable storage media, to:

create a profile for the group of e-mails based on the monitored processing of each respective e-mail of the group of e-mails, wherein the profile includes a spider graph and a lookup table;

determine that a predefined number of e-mails match, within the threshold, the group of e-mails; and subsequent to determining that the predefined number of e-mails match, within the threshold, the group of e-mails, update the profile for the group of e-mails based on the e-mails comprising the predefined number of e-mails determined to match.

10. The computer program product of claim 6, further comprising program instructions stored on the one or more computer readable storage media, to:

store the keyword from each e-mail of the group of e-mails and the attribute from each e-mail of the group of e-mails to a first lookup table;

identify a first keyword from the first e-mail and a first attribute from the first e-mail;

store the first keyword and the first attribute to a second lookup table; and wherein program instructions to determine that the first e-mail matches, within the threshold, the group of e-mails comprises program instructions to: determine that the second lookup table for the first e-mail at least partially matches the first lookup table for the group of e-mails via a comparison of the second lookup table to the first lookup table.

11. A computer system comprising:
one or more computer processors;
one or more computer readable storage media; and
program instructions stored on the one or more computer readable storage media for execution by at least one of the one or more computer processors, the program instructions comprising:

program instructions to receive an indication of receipt of a first e-mail;

program instructions to determine that the first e-mail matches, within a threshold, a group of e-mails;

program instructions to update the group of e-mails by adding the first e-mail to the group of e-mails;

program instructions to create a first spider graph for the updated group of e-mails based on one or more extracted tones for each e-mail of the group of e-mails, wherein:

the one or more extracted tones are comprised of between one and eight emotions including anger, anticipation, joy, trust, fear, surprise, sadness, and disgust; and the first spider graph includes one or more quantitative variables represented on axes starting from the same point;

program instructions to retrieve an image associated with the updated group of e-mails;

program instructions to assign the retrieved image to the updated group of e-mails;

program instructions to create a visual association between the assigned image and each e-mail in the updated group of e-mails such that when selected, each e-mail in the updated group of e-mails displays the assigned image;

program instructions to monitor a processing of a plurality of e-mails by a user of a computing device, utilizing machine learning, wherein the program instructions to monitor the processing of the plurality of e-mails by the user of the computing device comprises:

program instructions to extract an overall tone from each e-mail, wherein:

sentiment analysis, comprised of natural language processing, text analysis, and computational linguistics, is utilized to extract the overall tone from each e-mail;

the overall tone includes a plurality of emotions; and each emotion of the plurality of emotions is given a score;

program instructions to extract a keyword from each e-mail using keyword extraction for use in a lookup table; and program instructions to extract an attribute of each e-mail for use in the lookup table; and program instructions to create the group of e-mails based on monitored similarities between each e-mail of the group of e-mails.

12. The computer system of claim 11, wherein the extracted attribute is a number of recipients.

13. The computer system of claim 11, wherein program instructions to determine that the first e-mail matches, within the threshold, the group of e-mails comprises program instructions to:

create a second spider graph for the first e-mail; and
compare the first spider graph to the second spider graph.

14. The computer system of claim 11, further comprising program instructions stored on the one or more computer readable storage media for execution by at least one of the one or more computer processors, to:

create a profile for the group of e-mails based on the monitored processing of each respective e-mail of the group of e-mails, wherein the profile includes a spider graph and a lookup table;

determine that a predefined number of e-mails match, within the threshold, the group of e-mails; and subsequent to determining that the predefined number of e-mails match, within the threshold, the group of e-mails, update the profile for the group of e-mails based on the e-mails comprising the predefined number of e-mails determined to match.

* * * * *